US009830868B2

(12) United States Patent
Lin et al.

(10) Patent No.: US 9,830,868 B2
(45) Date of Patent: Nov. 28, 2017

(54) DISPLAY DEVICE AND RESET METHOD THEREOF

(71) Applicant: E Ink Holdings Inc., Hsinchu (TW)

(72) Inventors: Ya-Wen Lin, Hsinchu (TW); Yi-Ming Wu, Hsinchu (TW); Pei-Lin Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 100 days.

(21) Appl. No.: 14/658,240

(22) Filed: Mar. 16, 2015

(65) Prior Publication Data

US 2016/0012781 A1 Jan. 14, 2016

(30) Foreign Application Priority Data

Jul. 8, 2014 (TW) ............................ 103123492 A

(51) Int. Cl.
*G06F 3/02* (2006.01)
*G09G 5/00* (2006.01)
(Continued)

(52) U.S. Cl.
CPC ........... *G09G 3/344* (2013.01); *G09G 3/2003* (2013.01); *G09G 2300/08* (2013.01); *G09G 2300/0842* (2013.01); *G09G 2310/0202* (2013.01); *G09G 2310/0278* (2013.01); *G09G 2310/061* (2013.01)

(58) Field of Classification Search
None
See application file for complete search history.

(56) References Cited

U.S. PATENT DOCUMENTS

| | | | |
|---|---|---|---|
| 7,898,515 | B2 | 3/2011 | Moon et al. |
| 8,228,274 | B2 | 7/2012 | Chung et al. |

(Continued)

FOREIGN PATENT DOCUMENTS

| | | |
|---|---|---|
| CN | 1416007 | 5/2003 |
| CN | 1834763 | 9/2006 |

(Continued)

OTHER PUBLICATIONS

"Office Action of Taiwan Counterpart Application", dated Sep. 17, 2015, p. 1-p. 9.

*Primary Examiner* — Ilana Spar
*Assistant Examiner* — Kirk Hermann
(74) *Attorney, Agent, or Firm* — JCIPRNET

(57) ABSTRACT

A display device including a first common electrode, an active device array substrate, a display medium layer and a power system is provided. The active device array substrate includes a plurality of scan lines, a plurality of data lines, a plurality of transistors, a plurality of pixel electrodes and a second common electrode. Each of the transistors is electrically connected to one scan line and one data line, and the pixel electrodes are electrically connected to the transistors, respectively. The second common electrode and the pixel electrodes form a plurality of storage capacitors. The display medium layer is disposed between the first common electrode and the active device array substrate. The power system is electrically connected to the first common electrode and the second common electrode through two separated conductive routes, respectively. A reset method of a display device is also provided.

11 Claims, 4 Drawing Sheets

(51) Int. Cl.

| | |
|---|---|
| ***G09G 3/34*** | (2006.01) |
| ***G09G 3/20*** | (2006.01) |

(56) References Cited

U.S. PATENT DOCUMENTS

| | | | | |
|---|---|---|---|---|
| 8,368,630 | B2 | 2/2013 | Lee et al. | |
| 2003/0011869 | A1 | 1/2003 | Matsuda et al. | |
| 2003/0146895 | A1 | 8/2003 | Chung | |
| 2006/0209011 | A1* | 9/2006 | Miyasaka | G09G 3/344<br>345/107 |
| 2010/0053487 | A1 | 3/2010 | Wu et al. | |
| 2010/0309189 | A1* | 12/2010 | Mizusako | G09G 3/3614<br>345/212 |
| 2011/0164076 | A1 | 7/2011 | Lee | |
| 2013/0321499 | A1 | 12/2013 | Park et al. | |
| 2013/0328795 | A1 | 12/2013 | Yao et al. | |
| 2015/0029431 | A1* | 1/2015 | Fukai | G09G 3/3677<br>349/43 |

FOREIGN PATENT DOCUMENTS

| | | | |
|---|---|---|---|
| CN | 101655646 | | 2/2010 |
| JP | 2006227053 | | 8/2006 |
| JP | 2013154170 A | * | 7/2013 |
| TW | 200400403 | | 1/2004 |

* cited by examiner

DISPLAY DEVICE AND RESET METHOD THEREOF

CROSS-REFERENCE TO RELATED APPLICATION

This application claims the priority benefit of Taiwan application serial no. 103123492, filed on Jul. 8, 2014. The entirety of the above-mentioned patent application is hereby incorporated by reference herein and made a part of this specification.

BACKGROUND OF THE INVENTION

Field of the Invention

The invention relates to an electronic device and a reset method thereof, and more particularly, relates to a display device and a reset method thereof.

Description of Related Art

With advancements of display technology, display devices such as an electrophoretic display device or an electronic paper have been widely adopted in daily lives. Aforesaid electronic devices provide features including low power consumption and high convenience, and enable a great amount of information to be stored in the electronic devices by adopting an electronic storage design.

With population of the electronic devices grows each day, frequency and necessity for users to use the electronic devices are also continuously increased. However, open circuit between electronic elements caused by damages or collisions of the electronic elements in long-term use may result in malfunctions of the display devices. Generally, a common electrode corresponding to a display layer and a common electrode corresponding to a storage capacitor in existing display devices are both connected to a power supply through the same electrical wiring. Accordingly, a driving chip is required to reset display frames, and the display devices cannot be reset if the driving chip is unavailable or failed, or if circuits in a panel are abnormal.

SUMMARY OF THE INVENTION

The invention provides a display device, which is capable of resetting and repairing a display frame without driving by a driving unit (e.g., a driving chip).

The invention provides a reset method of a display device, which is capable of resetting a display frame without driving by a driving unit (e.g., a driving chip).

An embodiment of the invention provides a display device, which includes a first common electrode, an active device array substrate, a display medium layer and a power system. The active device array substrate includes a plurality of scan lines, a plurality of data lines, a plurality of transistors, a plurality of pixel electrodes and a second common electrode. Each of the transistors is electrically connected to one scan line and one data line, and the pixel electrodes are electrically connected to the transistors, respectively. The second common electrode and the pixel electrodes form a plurality of storage capacitors. The display medium layer is disposed between the first common electrode and the active device array substrate. The power system is electrically connected to the first common electrode and the second common electrode through two separated conductive routes, respectively.

In an embodiment of the invention, the display device further includes a driving unit, which is electrically connected to the power system, wherein the driving unit is configured to provide a plurality of scan signals transmitted through the scan lines to the transistors and a plurality of data signals transmitted through the data lines to the transistors in order to provide voltages corresponding to a display frame to the pixel electrodes.

In an embodiment of the invention, when the driving unit drives the display medium layer to display a display frame, the power system provides substantially identical voltage signals to the two conductive routes.

In an embodiment of the invention, when it is intended to reset the display medium layer, the power system provides two different voltages to the two conductive routes, respectively.

In an embodiment of the invention, the two different voltage signals reset the display medium layer into a white frame or a black frame.

In an embodiment of the invention, the two different voltage signals are alternating voltage (AC voltage) signals.

In an embodiment of the invention, the display medium layer includes a plurality of display capsules and a plurality of electrophoresis particles disposed in the display capsules.

An embodiment of the invention provides a reset method of a display device, which includes providing a display device, and providing two different voltage signals to the first common electrode and the second common electrode of the display device, respectively, so as to reset the display medium layer. The display device includes a first common electrode, an active device array substrate, and a display medium layer. The active device array substrate includes a plurality of scan lines, a plurality of data lines, a plurality of transistors, a plurality of pixel electrodes and a second common electrode. Each of the transistors is electrically connected to one scan line and one data line, and the pixel electrodes are electrically connected to the transistors, respectively. The second common electrode and the pixel electrodes form a plurality of storage capacitors. The display medium layer is disposed between the first common electrode and the active device array substrate.

In an embodiment of the invention, the display device further includes a power system and a driving unit. The power system is electrically connected to the first common electrode and the second common electrode through two separated conductive routes, respectively. The driving unit is electrically connected to the power system and the active device array substrate. When the driving unit drives the display medium layer to display the display frame, the power system provides substantially identical voltage signals to the two conductive routes. When it is intended to reset the display medium layer, the step of providing two different voltage signals to the first common electrode and the second common electrode, respectively, so as to reset the display medium layer includes sending the two different voltage signals into the two conductive routes.

In an embodiment of the invention, the step of sending the two different voltage signals into the two conductive routes includes sending the two different voltage signals by using an external power, or sending the two different voltage signals by using the power system.

In an embodiment of the invention, the two different voltage signals reset the display medium layer into a white frame or a black frame.

In an embodiment of the invention, the two different voltage signals are an AC voltage signal.

In an embodiment of the invention, the display medium layer includes a plurality of display capsules and a plurality of electrophoresis particles disposed in the display capsules.

Based on above, the display device provided according to the embodiments of the invention is capable of providing voltages separately to the first common electrode and the second common electrode, such that the display device may be reset by controlling the provided two voltages. In other words, the display device provided according to the embodiments of the invention is capable of clearing the display frame of the display device without using the driving unit. The reset method of the display device provided according to the embodiments of the invention is capable of providing the two different voltage signals to the first common electrode and the second common electrode of the display device without using the driving unit. In other words, the driving unit is not required for clearing the display frame of the display device.

To make the above features and advantages of the disclosure more comprehensible, several embodiments accompanied with drawings are described in detail as follows.

DESCRIPTION OF THE EMBODIMENTS

Figure 1:
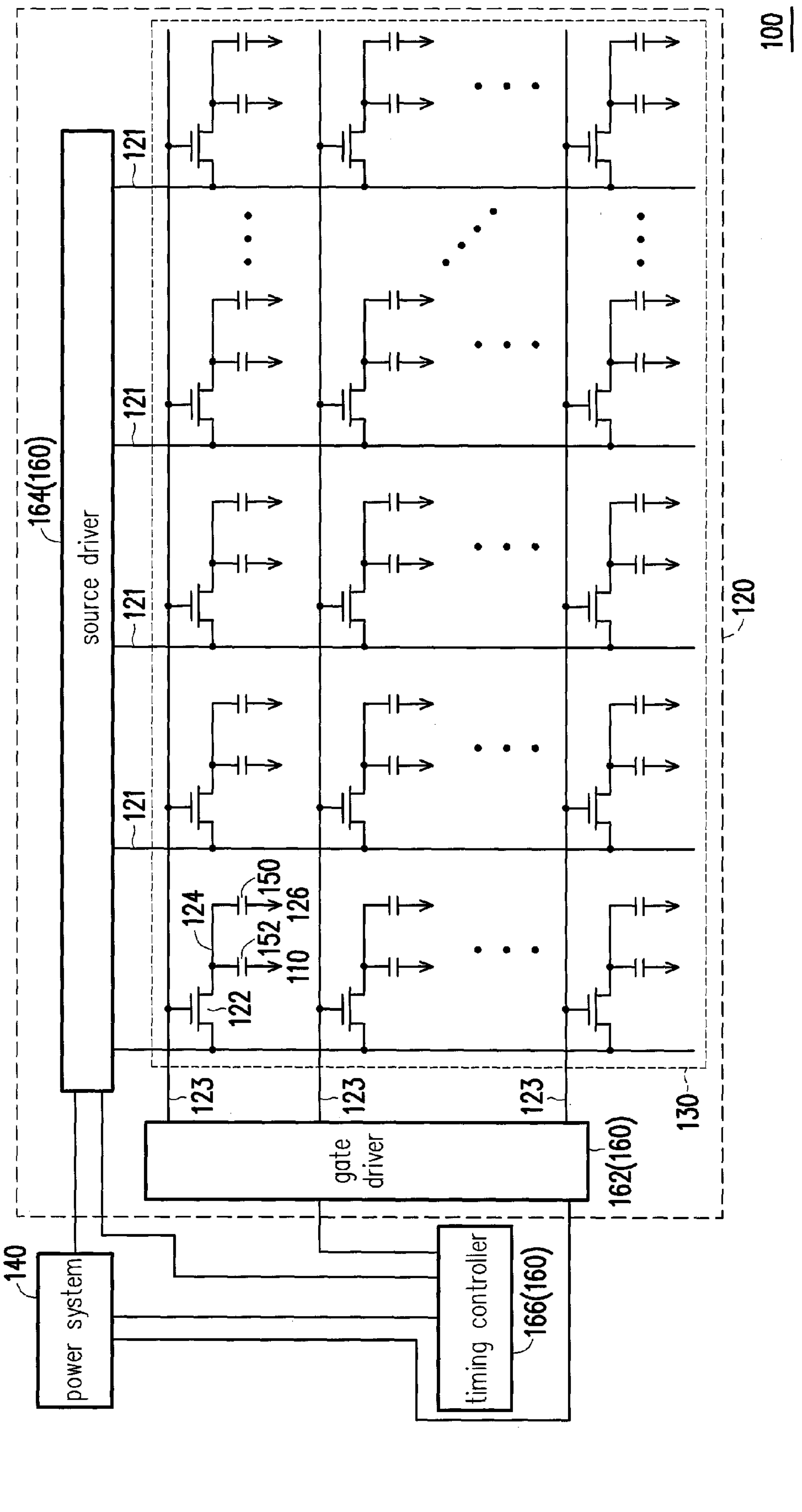
FIG. 1 and FIG. 2 are schematic diagrams of a display device according to an embodiment of the invention.
Figure 2:
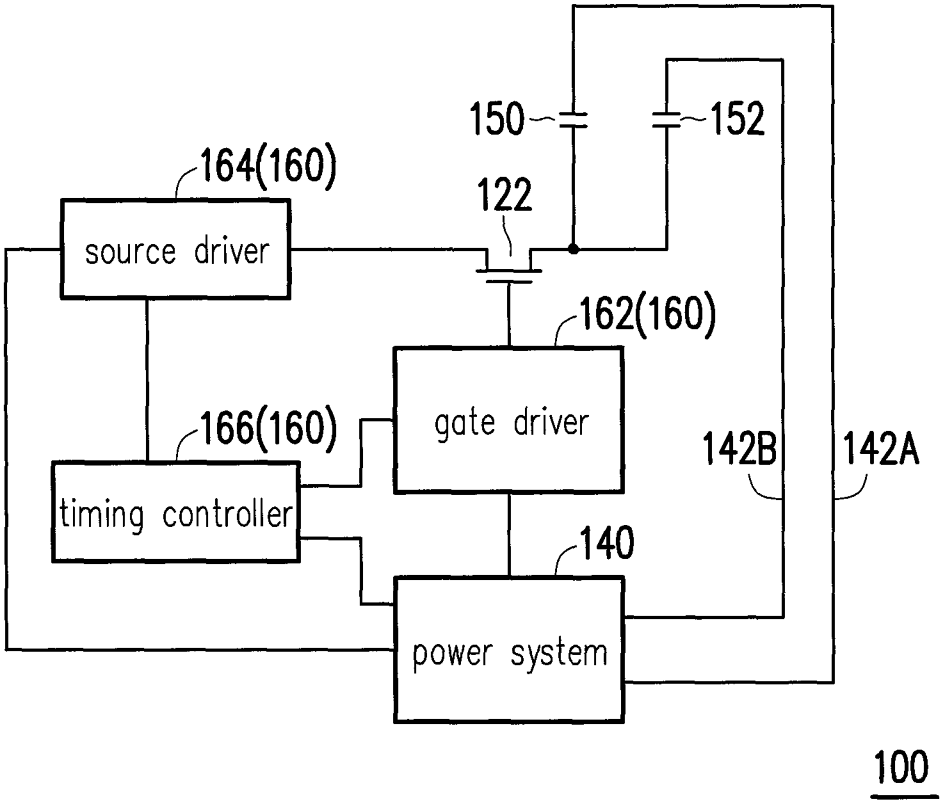
Figure 3:
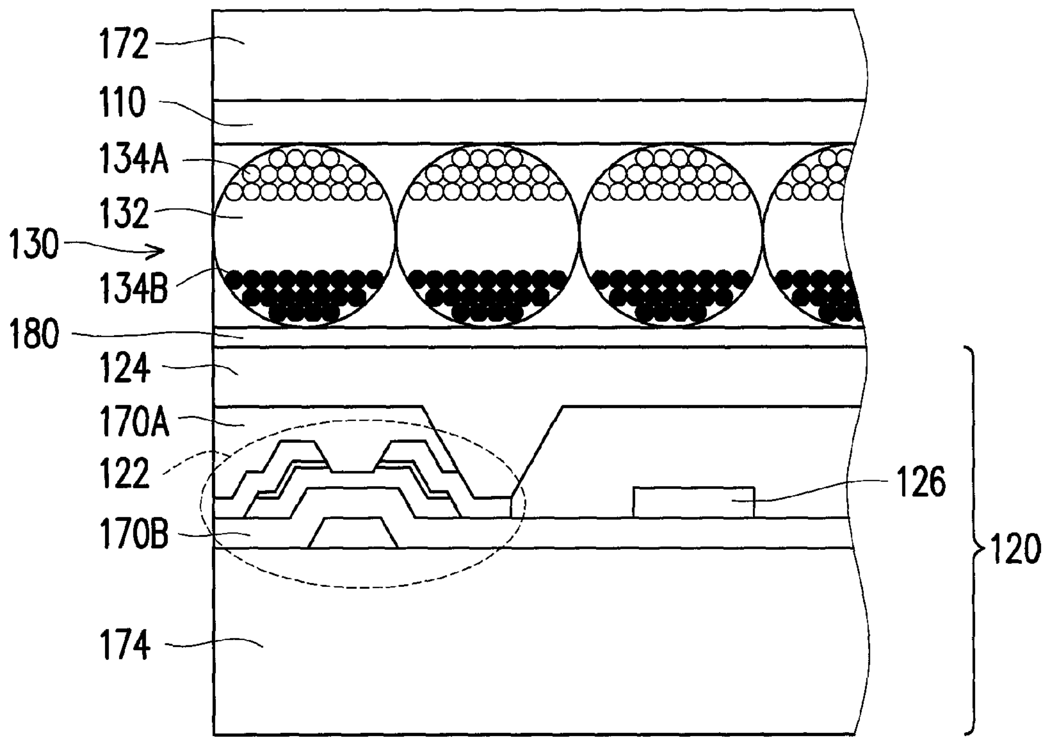
FIG. 3 is a cross-sectional diagram of a display device according to an embodiment of the invention.

FIG. 1 and FIG. 2 are schematic diagrams of a display device according to an embodiment of the invention. FIG. 3 is a cross-sectional diagram of a display device according to an embodiment of the invention. It should be noted that, some elements in the display device depicted in FIG. 1 are omitted in order to clearly describe disposition of each element in an active device array substrate. Herein, only one of a plurality of transistors in the active device array substrate depicted in FIG. 2 is illustrated as an example in order to clearly describe a method of electrical connecting to a power system. The cross-sectional diagram depicted in FIG. 3 mainly serves to clearly describe a disposition relation of a first common electrode, a second common electrode and pixel electrodes for forming a storage capacitor, instead of limiting disposing positions of aforesaid elements in the display device. Further, it should also be noted that, a quantity of elements illustrated in FIG. 1 and FIG. 2 is not intended to limit a quantity of elements in the invention. Referring to FIG. 1 to FIG. 3, in an embodiment of the invention, a display device 100 includes a first common electrode 110, an active device array substrate 120, a display medium layer 130 and a power system 140. The active device array substrate 120 includes a plurality of data lines 121, a plurality of scan lines 123, a plurality of transistors 122, a plurality of pixel electrodes 124 and a second common electrode 126. Each of the transistors 122 is electrically connected to one data line 121 and one scan line 123, and the pixel electrodes 124 are electrically connected to the transistors 122, respectively. The second common electrode 126 and the pixel electrodes 124 form a plurality of storage capacitors 150. The display medium layer 130 is disposed between the first common electrode 110 and the active device array substrate 120. In this embodiment, a glue layer 180 may be disposed between the active device array substrate 120 and the display medium layer 130, and may connect the active device array substrate 120 and the display medium layer 130. The power system 140 is electrically connected to the second common electrode 126 and the first common electrode 110 through two separated conductive routes 142A and 142B, respectively. Referring to FIG. 1, FIG. 2 and FIG. 3, in the present embodiment, a plurality of display medium capacitors 152 are formed between the first common electrode 110 and the pixel electrodes 124 of the active device array substrate 120, and the display medium layer 130 is disposed between the display medium capacitors 152. The conductive route 142B electrically connects the display medium capacitors 152 to the power system 140, and the conductive route 142A electrically connects the storage capacitors 150 to the power system 140. Therefore, the power system 140 is capable of providing, for example, different voltage signals to the conductive routes 142A and 142B, respectively. Accordingly, the display medium capacitors 152 may receive the same voltage difference for charging, and thereby reset the display medium layer 130 (i.e., clearing a display frame of the display medium layer 130, for example).

Referring to FIG. 1 to FIG. 3, in brief, a reset method of the display device according to an embodiment of the invention is provided as follows. First, the display device 100 of the foregoing embodiment is provided, and then two different voltage signals are provided by the power system 140 to the first common electrode 110 and the second common electrode 126 in order to reset the display medium layer 130, but the invention is not limited thereto. In the present embodiment, by using the separated conductive routes 142A and 142B, an external power may also be electrically connected to the conductive routes 142A and 142B, and provide the two different voltage signals to reset the display medium layer 130.

Specifically, referring to FIG. 1 to FIG. 2, in an embodiment of the invention, the two different voltage signals provided by the power system 140 are AC voltage signals.

More specifically, referring to FIG. 1 and FIG. 2, the display device 100 further includes a driving unit 160, which is electrically connected to the power system 140, wherein the driving unit 160 is configured to provide a plurality of scan signals transmitted through the scan lines 123 to the transistors 122 and a plurality of data signals transmitted through the data lines 121 to the transistors 122 in order to provide voltages corresponding to the display frame to the pixel electrodes 124. Specifically, the driving unit 160 includes a gate driver 162, a source driver 164 and a timing controller 166, wherein the gate driver 162 is electrically connected to the scan lines 123, the source driver 164 is electrically connected to the data lines 121, and each of the gate driver 162, the source driver 164 and the timing controller 166 is electrically connected to the power system 140. The source driver 164 transmits the data signals through the data lines 121 to the transistors 122, and the gate driver 162 transmits the scan signals through the scan lines 123 to the transistors 122.

More specifically, referring to FIG. 1 and FIG. 2, when the driving unit 160 drives the display medium layer 130 to display the display frame, the power system 140 provides substantially identical voltage signals to the two conductive routes 142A and 142B.

Referring to FIG. 2 and FIG. 3, in an embodiment of the invention, the display medium layer 130 includes a plurality of display capsules 132 and a plurality of electrophoresis particles 134A and 134B disposed in the display capsules. More specifically, in the present embodiment, the display medium layer 130 includes a plurality of white electrophoresis particles 134A and a plurality of black electrophoresis particles 134B. When the two different voltage signals are provided by the power system 140 to the first common electrode 110 and the second common electrode 126, the white electrophoresis particles 134A and the black electrophoresis particles 134B may be gathered at two opposite sides of the display medium layer 130, respectively. In other words, in the present embodiment, the two different voltage signals may reset the display medium layer 130 into a white frame or a black frame. In other embodiments, those electrophoresis particles may further include other colors.

Specifically, referring to FIG. 1 and FIG. 3, the display device 100 according to an embodiment of the invention further includes an upper substrate 172, a lower substrate 174, and dielectric layers 170A and 170B. Accordingly, the display medium capacitors 152 may be formed by the pixel electrodes 124 and the first common electrode 110, and the storage capacitors 150 may be formed by the pixel electrodes 124 and the second common electrode 126.

Figure 4:
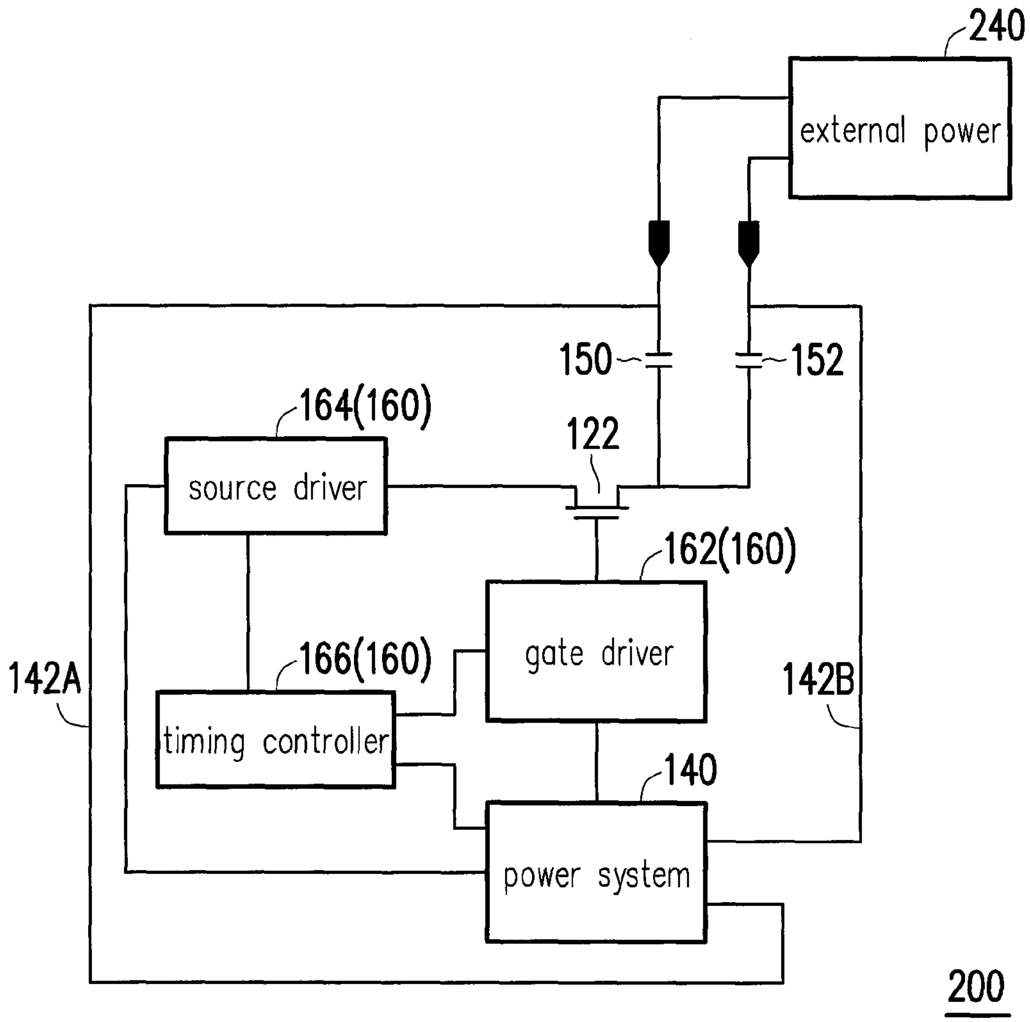
FIG. 4 illustrates a reset method of a display device according to another embodiment of the invention.

FIG. 4 illustrates a reset method of a display device according to another embodiment of the invention. Referring to FIG. 4, a display device 200 in another embodiment of the invention is similar to the display device 100 of the foregoing embodiment, and a difference between the two is that the display device 200 of the present embodiment sends the two different voltage signals by using an external power 240. More specifically, the power system 140 may provide the identical voltage signals when the display frame is displayed by the display device 200 of the present embodiment, and the external power 240 may provide the different voltage signals to the conductive routes 142A and 142B when it is intended to reset the display device 200. In the present embodiment, the external power 240 is, for example, an AC power supply, which is electrically connected to electrode pads on the conductive routes 142A and 142B in a detachable manner through a probe or a crocodile clip (it is illustrated in FIG. 4 by using the probe as an example), but the invention is not limited thereto. In other words, in the embodiment of the invention, the step of sending the two different voltage signals into the two conductive routes 142A and 142B includes sending the two different voltage signals by using the external power 240, or sending the two different voltage signals by using the power system 140.

In summary, the display device provided according to the embodiments of the invention is capable of providing voltages to the first common electrode and the second common electrode through the separated two conductive routes, such that the two different voltage signals may be directly provided to reset the display device. In other words, the display device provided according to the embodiments of the invention is capable of clearing the display frame of the display device without using the driving unit. The reset method of the display device provided according to the embodiments of the invention is capable of providing the two different voltage signals to the first common electrode and the second common electrode of the display device without using the driving unit. In other words, the driving unit is not required for clearing the display frame of the display device.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A display device, comprising:
- a first common electrode;
- an active device array substrate, comprising:
  - a plurality of scan lines;
  - a plurality of data lines;
  - a plurality of transistors, each of the transistors being connected to one of the scan lines and one of the data lines;
  - a plurality of pixel electrodes, electrically connected to the transistors, respectively; and
  - a second common electrode, wherein the second common electrode and the pixel electrodes form a plurality of storage capacitors;
- a display medium layer, disposed between the first common electrode and the active device array substrate; and
- a power system, electrically connected to the first common electrode and the second common electrode through two separated conductive routes, respectively,
- wherein the display device further comprises a driving unit, when the driving unit drives the display medium layer to display a display frame, the power system provides identical voltage signals to the two conductive routes, and
- wherein when intending to reset the display medium layer, the power system provides two different voltages to the two conductive routes, respectively.

2. The display device of claim 1, wherein the driving unit is electrically connected to the power system, and the driving unit is configured to provide a plurality of scan signals transmitted through the scan lines to the transistors and a plurality of data signals transmitted through the data lines to the transistors in order to provide voltages corresponding to the display frame to the pixel electrodes.

3. The display device of claim 2, wherein the two different voltage signals reset the display medium layer into a white frame or a black frame.

4. The display device of claim 2, wherein the two different voltage signals are AC voltage signals.

5. The display device of claim 1, wherein the display medium layer comprises:
- a plurality of display capsules; and
- a plurality of electrophoresis particles disposed in the display capsules.

6. A reset method of a display device, comprising:
- providing a display device, the display device comprising:
  - a first common electrode;
  - an active device array substrate, comprising:
    - a plurality of scan lines;
    - a plurality of data lines;
    - a plurality of transistors, each of the transistors being connected to one of the scan lines and one of the data lines;
    - a plurality of pixel electrodes, electrically connected to the transistors, respectively; and
    - a second common electrode, wherein the second common electrode and the pixel electrodes form a plurality of storage capacitors; and
  - a display medium layer, disposed between the first common electrode and the active device array substrate,
  - wherein the display device further comprises a power system and a driving unit, the power system is electrically connected to the first common electrode and the second common electrode through two separated conductive routes, respectively, and the driving unit is electrically connected to the power system and the active device array substrate, and wherein when the driving unit drives the display medium layer to display a display frame, the power system provides identical voltage signals to the two conductive routes; and providing two different voltage signals to the first common electrode and the second common electrode, respectively, so as to reset the display medium layer.

7. The reset method of the display device of claim 6, wherein when intending to reset the display medium layer, the step of providing two different voltage signals to the first common electrode and the second common electrode, respectively, so as to reset the display medium layer comprises sending the two different voltage signals into the two conductive routes.

8. The reset method of the display device of claim 7, wherein the step of sending the two different voltage signals into the two conductive routes comprises sending the two different voltage signals by using an external power, or sending the two different voltage signals by using the power system.

9. The reset method of the display device of claim 6, wherein the two different voltage signals reset the display medium layer into a white frame or a black frame.

10. The reset method of the display device of claim 6, wherein the two different voltage signals are AC voltage signals.

11. The reset method of the display device of claim 6, wherein the display medium layer further comprises:

a plurality of display capsules; and a plurality of electrophoresis particles disposed in the display capsules.

* * * * *